Patented Jan. 7, 1930

1,742,650

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

CONSTRUCTIONAL MATERIAL

No Drawing.   Application filed July 30, 1925.   Serial No. 47,173.

Heretofore it has been customary to fabricate expansion joints through the use of saturated felt linters, fine wood pulp fibres, roofing scrap containing finished roofing material prepared from short fibred felt, etc., readily saturated, which either was fabricated in block formation or in layers of sheet material made up of saturated felt and adhered together with an asphaltic binder.

I have found through practice and experiment that a strong mastic sheet material can be fabricated by the use of blown asphalts or similar binding material with long linen or other suitable fibre primarily used in the fabrication of rubber tires. I have found by investigation that there is a considerable quantity of this material available on the market at attractive prices, and through the use of a hog machine these tires can be reduced into sections and such parts transferred to a shredder which will shred the rubber and fabric.

I find that the vulcanized rubber particles distribute themselves through the shredded fabric and that many of the threads adhere together through the influence of the vulcanized rubber and thus add additional strength to the threads.

I find that by shredding this material through an inch screen, the preferred sizes or sections or threads are produced which have considerable of the vulcanized rubber adhering. If the material is shredded too fine, the threads are reduced to a fuzzy mass and easily penetrated by the binder, also assuming the properties of a felt structure rather than the strong interwoven fibrous matter covered by vulcanized rubber. The small particles of rubber distributed throughout add resiliency to the mass while the long threads secured through a screen of this kind make a very strong web and binder for the mass. By functioning in the manner described, much of the strong fabric material is left intact and not readily penetrated by the bituminous material, and much of the fabric is protected by the rubber coating.

The preferred mixture is that of a union of the material described with a blown asphalt preferably having a penetration of 19° at 32° F. and a melt point of approximately 240°, but any blown asphalt or in fact any asphalt may be used or any other binding means which would be suitable for the purpose.

In addition to the shredded tire casings I may also desire to use other fibrous materials which in certain instances might be desirable for realizing results which the shredded tire casings alone would not accomplish. In any event the mixture will contain a goodly portion of the shredded tire casings as a primary filling medium, with such other fibrous material representing a secondary filling medium or mediums.

In the majority of cases the filling material or materials would not exceed thirty-five per cent, with sixty-five per cent binder. This would be especially so if shredded tire casings alone were used for the filling medium. This thirty-five per cent filling medium in the case of shredded tire casings would also include whatever percentage of vulcanized rubber particles may be carried by the shredded tire casings. If other filling materials were incorporated it should not ordinarily exceed ten per cent, and as far as this example is concerned would bring the filling medium up to forty-five per cent and reduce the binder to fifty-five per cent. I may also desire to add fuller's earth, clays, infusorial earth, or in fact any other such substance which might help to give body to the binder. In such event the latter material would not ordinarily exceed five per cent, which would reduce the binding material to fifty per cent, all the combined filling mediums equalling fifty per cent.

The above percentages are given merely as examples of how the invention can be reduced to practice, in fact, with the exception of the shredded tire casings, the other materials identified are of secondary importance and are simply named to show how additional miscellaneous filling mediums may be used in combination with the primary filling medium, which, as stated, is shredded tire casings, and the same together with the use of this primary filler with a binding material of the character described will be the salient features of the invention.

I claim:—

1. A preformed bituminous slab consisting of a mass of intimately mixed rubber, cotton fiber, asphalt, and a filler, the whole being compacted to form a solid elastic slab sufficiently rigid to hold its shape.

2. A preformed bituminous slab consisting of intimately mixed shredded rubberized fabric, asphalt, and a filler, the whole being compacted to form a solid elastic slab sufficiently rigid to hold its shape.

3. A preformed bituminous slab consisting of intimately mixed shredded tire casings, asphalt, and a filler, the whole being compacted to form a solid elastic slab sufficiently rigid to hold its shape.

4. A preformed expansion joint strip consisting of a mass of intimately mixed rubber, cotton fiber, asphalt, and a filler, the whole being compacted to form a solid elastic slab sufficiently rigid to hold its shape.

5. A preformed expansion joint strip consisting of intimately mixed shredded rubberized fabric, asphalt, and a filler, the whole being compacted to form a solid elastic slab sufficiently rigid to hold its shape.

6. A preformed expansion joint strip consisting of intimately mixed shredded tire casings, asphalt, and a filler, the whole being compacted to form a solid elastic slab sufficiently rigid to hold its shape.

7. A preformed expansion joint strip consisting of a mass of comminuted intimately mixed rubber, cotton fiber, high test asphalt and a body-forming wearing substance, the whole being compacted to form a solid elastic slab sufficiently rigid to hold its shape.

In testimony whereof I have signed my name to this specification on this 27th day of July, A. D., 1925.

ALBERT C. FISCHER.